United States Patent
Li et al.

(10) Patent No.: US 11,148,120 B2
(45) Date of Patent: Oct. 19, 2021

(54) METHODS FOR THE TREATMENT OF FLUE GAS STREAMS USING SORBENT COMPOSITIONS WITH REDUCED AUTO IGNITION PROPERTIES

(71) Applicant: ADA Carbon Solutions, LLC, Littleton, CO (US)

(72) Inventors: Möwen Li, Highlands Ranch, CO (US); Christopher Vizcaino, Littleton, CO (US); Jacob B. Lowring, Coushatta, LA (US); Roger H. Cayton, Castle Rock, CO (US)

(73) Assignee: ADA Carbon Solutions, LLC, Littleton, CO (US)

( * ) Notice: Subject to any disclaimer, the term of this patent is extended or adjusted under 35 U.S.C. 154(b) by 0 days.

(21) Appl. No.: 15/729,392

(22) Filed: Oct. 10, 2017

(65) Prior Publication Data

US 2018/0029009 A1 Feb. 1, 2018

Related U.S. Application Data

(62) Division of application No. 15/093,414, filed on Apr. 7, 2016, now abandoned.

(60) Provisional application No. 62/144,146, filed on Apr. 7, 2015.

(51) Int. Cl.
| | |
|---|---|
| *B01D 53/64* | (2006.01) |
| *B01J 20/20* | (2006.01) |
| *B01J 20/28* | (2006.01) |
| *B01J 20/32* | (2006.01) |
| *B01D 53/02* | (2006.01) |
| *B01J 20/02* | (2006.01) |
| *B01J 20/04* | (2006.01) |

(52) U.S. Cl.
CPC .............. *B01J 20/20* (2013.01); *B01D 53/02* (2013.01); *B01D 53/64* (2013.01); *B01J 20/0266* (2013.01); *B01J 20/0281* (2013.01); *B01J 20/045* (2013.01); *B01J 20/046* (2013.01); *B01J 20/28004* (2013.01); *B01J 20/28011* (2013.01); *B01J 20/28016* (2013.01); *B01J 20/28071* (2013.01); *B01J 20/3204* (2013.01); *B01J 20/3234* (2013.01); *B01J 20/3236* (2013.01); *B01D 2253/102* (2013.01); *B01D 2253/25* (2013.01); *B01D 2258/0283* (2013.01)

(58) Field of Classification Search
CPC ................................ B01D 53/02; B01D 53/64
See application file for complete search history.

(56) References Cited

U.S. PATENT DOCUMENTS

| | | | |
|---|---|---|---|
| 4,578,256 A | 3/1986 | Nishino et al. | |
| 5,492,882 A | 2/1996 | Doughty et al. | |
| 7,615,194 B2 | 11/2009 | Matumura et al. | |
| 7,722,843 B1 | 5/2010 | Srinivasachar | |
| 8,008,228 B2 * | 8/2011 | Heschel | B01J 20/20 502/417 |
| 8,309,046 B2 * | 11/2012 | Pollack | B01D 53/02 423/210 |
| 8,524,186 B2 | 9/2013 | Kawamura et al. | |
| 8,551,431 B1 * | 10/2013 | Adams | B01D 53/64 423/210 |
| 8,691,722 B2 | 4/2014 | Gadkaree et al. | |
| 8,715,599 B2 | 5/2014 | Pollack et al. | |
| 9,314,767 B2 | 4/2016 | McMurray et al. | |
| 9,468,904 B2 | 10/2016 | McMurray et al. | |
| 9,539,538 B2 | 1/2017 | Wong et al. | |
| 9,561,462 B2 | 2/2017 | McMurray et al. | |
| 1,003,512 A1 | 7/2018 | McMurray et al. | |
| 1,013,740 A1 | 11/2018 | McMurray et al. | |
| 1,015,992 A1 | 12/2018 | McMurray | |
| 1,030,770 A1 | 6/2019 | Li et al. | |
| 1,042,103 A1 | 9/2019 | Li et al. | |
| 1,044,949 A1 | 10/2019 | Huston et al. | |
| 1,045,674 A1 | 10/2019 | Huston et al. | |
| 2006/0204418 A1 | 9/2006 | Chao et al. | |
| 2007/0254807 A1 | 11/2007 | Bisque et al. | |
| 2008/0292512 A1 | 11/2008 | Kang | |
| 2013/0109562 A1 | 5/2013 | Wong et al. | |
| 2013/0157845 A1 * | 6/2013 | Nalepa | B01D 53/02 502/401 |

(Continued)

FOREIGN PATENT DOCUMENTS

| | | |
|---|---|---|
| CA | 2686986 A1 | 11/2008 |
| CA | 2576210 C | 6/2010 |
| CA | 2926826 C | 5/2018 |

OTHER PUBLICATIONS

Office Action dated Jan. 17, 2017 issued in Canadian Patent Application No. 2,926,826.

(Continued)

*Primary Examiner* — Stuart L Hendrickson
(74) *Attorney, Agent, or Firm* — Sheridan Ross P.C.

(57) ABSTRACT

An activated carbon sorbent composition comprising activated carbon and a passivation agent, wherein the activated carbon sorbent composition exhibits reduced self-heating or auto-ignition properties as compared to the activated carbon. The activated carbon sorbent composition may be utilized to sequester contaminants such as mercury from a flue gas stream. The passivation agent includes a sulfur species, and may be a sulfur oxide compound, a sulfide compound, or an organic sulfur compound. Methods for the manufacture of the activated carbon sorbent composition and for the sequestration of contaminants in a flue gas stream using the composition are also disclosed.

54 Claims, 2 Drawing Sheets

(56) References Cited

U.S. PATENT DOCUMENTS

| | | |
|---|---|---|
| 2014/0186625 A1 | 7/2014 | Wong et al. |
| 2014/0191157 A1 | 7/2014 | Wong et al. |
| 2015/0165416 A1 | 6/2015 | Wong et al. |
| 2015/0235326 A1 | 8/2015 | Hansen et al. |
| 2016/0214078 A1 | 7/2016 | Li et al. |
| 2016/0296908 A1 | 10/2016 | Li et al. |
| 2017/0043316 A1 | 2/2017 | Li et al. |
| 2017/0043321 A1 | 2/2017 | Li et al. |
| 2018/0001257 A1 | 1/2018 | Wong et al. |
| 2018/0028970 A1 | 2/2018 | Huston et al. |
| 2018/0029006 A1 | 2/2018 | Li et al. |
| 2018/0029008 A1 | 2/2018 | Li et al. |
| 2018/0170773 A1 | 6/2018 | Mitchek et al. |
| 2019/0291041 A1 | 9/2019 | McMurray et al. |
| 2019/0358578 A1 | 11/2019 | McMurray et al. |
| 2020/0001228 A1 | 1/2020 | Li et al. |
| 2020/0047107 A1 | 2/2020 | Cayton |

OTHER PUBLICATIONS

Notice of Allowance dated Oct. 10, 2017 issued in Canadian Patent Application No. 2,926,826.
Office Action dated Apr. 28, 2017 issued in U.S. Appl. No. 15/093,414.
Final Office Action dated Feb. 2, 2018 issued in U.S. Appl. No. 15/093,414.
Office Action dated Jul. 5, 2018 issued in U.S. Appl. No. 15/093,414.
U.S. Appl. No. 16/657,634, filed Oct. 18, 2019, Huston et al.
U.S. Appl. No. 16/725,993, dated Dec. 23, 2019, Huston et al.
Official Action for U.S. Appl. No. 15/093,414, dated Apr. 22, 2019 5 pages.
Final Action for U.S. Appl. No. 15/093,414, dated Jan. 17, 2020 5 pages.
U.S. Appl. No. 15/930,145, dated May 12, 2020, Li et al.
U.S. Appl. No. 16/911,161, dated Jun. 24, 2020, Wong et al.

* cited by examiner

METHODS FOR THE TREATMENT OF FLUE GAS STREAMS USING SORBENT COMPOSITIONS WITH REDUCED AUTO IGNITION PROPERTIES

CROSS-REFERENCE TO RELATED APPLICATIONS

This application claims the priority benefit as a divisional application of co-pending U.S. patent application Ser. No. 15/093,414 filed on Apr. 7, 2016, which claims the priority benefit under 35 USC § 119 of U.S. Provisional Patent Application No. 62/144,146 filed on Apr. 7, 2015. Each of these applications is incorporated herein by reference in its entirety.

FIELD

This disclosure relates to the field of sorbent compositions, particularly activated carbon sorbent compositions that exhibit reduced self-heating and/or auto-ignition properties. These compositions may be utilized to efficiently remove metal contaminants from flue gas streams.

BACKGROUND

Activated carbon is a form of carbon processed to have many small, low-volume pores that increase the surface area of the carbon. The high surface area gives the activated carbon high adsorption properties and provides a large surface for chemical reactions. Activated carbons have many applications and are used in gas purification, decaffeination, gold purification, metal extraction, medicines, sewage treatment, and air filters such as gas masks and respirators. Activated carbons may be classified based on size, preparation method, and industrial applications. Powdered activated carbon (PAC) and granular activated carbon (GAC) are the most common types of activated carbons having applications in water and air purification systems. While GAC can be either a particulate or extruded form, PAC is a particulate form with powder or fine granules of less than 1.0 mm in size with an average diameter typically between 0.15 mm and 0.25 mm and lower. PAC has especially high surface area, exposing significant amounts of beneficial chemically functional and reaction sites and creating high adsorptive potential for many compounds. For this reason, PAC is especially useful for addition directly to process units such as raw water intakes, rapid mix basins, gravity filters, and flue gas streams for adsorption of contaminants.

Due to its high adsorption capacity, PAC injection is the leading technology for contaminant emission control at coal-fired power plants and industrial boilers. At these sites, PAC is introduced into a flue gas stream produced by the burning of coal in the boiler. One target contaminant in these systems is mercury and PAC injection technology has shown the potential to control mercury emissions in most coal-fired plants. Mercury is well known to be a highly toxic compound, and mercury exposure at appreciable levels can lead to adverse health effects for people of all ages, including harm to the brain, heart, kidneys, lungs, and immune system. Although mercury is naturally occurring, most emissions result from human activities such as burning fossil fuels and other industrial processes. For example, in the United States about 40% of the mercury introduced into the environment comes from coal-fired power plants.

In the United States and Canada, federal and state/provincial regulations have been implemented or are being considered to reduce mercury emissions, particularly from coal-fired power plants, steel mills, cement kilns, waste incinerators and boilers, industrial coal-fired boilers, and other coal-combusting facilities. For example, the United States Environmental Protection Agency (U.S. EPA) has promulgated Mercury Air Toxics Standards (MATS), which would among other things require coal-fired power plants to capture at least approximately 80% to 90% of their mercury emissions beginning in 2015.

Large amounts of PAC are required for mercury capture at plants. The PAC is shipped via truck or rail to plant sites and often is stored in silos prior to use. Between 38,000 and 42,000 lbs. of PAC may be contained in a truckload while as much as 155,000 lbs. may be contained in a railway container. Because large amounts of activated carbon are shipped and stored at plant sites and may build up in process units of flue gas streams, the PAC must be monitored for safety. One characteristic that must be monitored, particularly with respect to potential for accumulation of activated carbon in the baghouse units of TOXECON™ systems, is the ignition temperature or kindling point. This is because such systems remove particulate matter (e.g., fly ash) before injection of the PAC sorbent into the flue gas stream. The PAC sorbent is subsequently removed, typically in a baghouse unit. Therefore, the particulate matter collected in the baghouse unit is predominately PAC and is not diluted with fly ash. This activated carbon can adsorb oxygen causing exothermic reactions on the surface and produce heat (*Activated Carbon*, Marsh, Harry, and Reynosa, Francisco Rodriguez, Elsevier Science 1$^{st}$ Edition, Oct. 13, 2005).

Activated carbon surfaces at equilibrium may contain about 5 to 15 wt. % oxygen and if the surface becomes deficient in oxygen, the activated carbon will strive to chemisorb oxygen to reach equilibrium. This oxygen chemisorption is highly exothermic and since activated carbon is a good insulator, the chemisorption can occur adiabatically with the majority of the heat contributing to a rise in the internal temperature of the activated carbon. If the temperature of the activated carbon exceeds its auto-ignition temperature (ca. 752° F., 400° C.), and if not abated, the activated carbon may smolder releasing carbon monoxide (CO), and can ignite.

SUMMARY

It would be advantageous to provide an activated carbon sorbent composition that overcomes the traditional limitations of conventional activated carbon sorbents, such as by exhibiting a diminished propensity for self-heating and/or auto-ignition.

Therefore, it is one object to provide an activated carbon sorbent composition that has a reduced propensity for self-heating and/or auto-ignition. The activated carbon sorbent composition, in addition to reduced self-heating and/or auto-ignition properties, may also effectively act as a sorbent to efficiently and rapidly remove contaminants such as mercury from a flue gas stream, e.g., to meet governmental regulations for emissions. Reduced self-heating and auto-ignition properties may be demonstrated by a reduced enthalpy (e.g., a reduced specific enthalpy) and/or a reduced oxidation rate (e.g., a reduced peak oxidation rate).

According to one embodiment, an activated carbon sorbent composition that exhibits reduced self-heating and/or auto-ignition properties is disclosed. The activated carbon sorbent composition comprises activated carbon and a passivation agent. The passivation agent comprises a sulfur oxide compound that is selected from the group consisting of: (i) a nonionic sulfur oxide compound defined by the formula $SO_y$, where y=2 or 3; and (ii) an ionic sulfur oxide compound comprising an anion defined by the formula $S_xO_y^{2-}$, where x=1 or 2 and y=2, 3, 4, 5, or 6.

A number of feature refinements and additional features (e.g., characterizations) are applicable to this activated carbon sorbent composition. These feature refinements and additional features may be implemented individually or in any combination. As such, each of the following features may be, but are not required to be, used with any other feature or combination of features relating to this embodiment of an activated carbon sorbent composition.

In one characterization, the sulfur oxide compound is an ionic sulfur oxide compound. For example, the ionic sulfur oxide compound may comprise a cation that is selected from the group consisting of hydrogen, a nitrogen-containing compound, and a metal cation. In one particular characterization, the cation is hydrogen, for example where the ionic sulfur oxide compound is sulfuric acid. In another particular characterization, the cation is a nitrogen-containing compound, for example where the nitrogen-containing compound is ammonium. In this characterization, the ionic sulfur oxide compound may be ammonium sulfate, for example. In another characterization, the nitrogen-containing compound is an alkylammonium compound. In yet another characterization, the cation is a metal cation. For example, the metal cation may be selected from the group consisting of an alkali metal, an alkaline earth metal and a transition metal. In one characterization, the metal cation is an alkali metal, for example where the alkali metal is selected from the group consisting of lithium (Li), sodium (Na), and potassium (K). In one particular characterization, the alkali metal is sodium. In yet another characterization, the metal cation is an alkaline earth metal, such as where the alkaline earth metal is selected from the group consisting of magnesium (Mg), calcium (Ca), and barium (Ba). In yet another characterization, the metal cation is a transition metal, such as where the transition metal is selected from the group consisting of zinc (Zn), iron (Fe), copper (Cu), nickel (Ni), titanium (Ti), manganese (Mn), aluminum (Al), and vanadium (V). In one particular characterization, the transition metal is zinc. In another particular characterization, the transition metal is iron. In yet another particular characterization, the transition metal is aluminum.

In another characterization of this embodiment of an activated carbon sorbent composition, the sorbent composition comprises at least about 0.1 wt. % of the sulfur oxide compound, such as at least about 0.5 wt. % of the sulfur oxide compound. In another characterization, the sorbent composition comprises not greater than about 40 wt. % of the sulfur oxide compound, such as not greater than about 20 wt. % of the sulfur oxide compound, such as not greater than about 10 wt. % of the sulfur oxide compound. In one particular characterization, the sorbent composition comprises not greater than about 5 wt. % of the sulfur oxide compound.

In certain characterizations, the sorbent composition has a reduced specific enthalpy as compared to the specific enthalpy of the activated carbon (i.e., without an effective amount of the passivation agent). In one characterization, the specific enthalpy of the sorbent composition is at least about 5% lower than the specific enthalpy of the activated carbon, for example at least about 10% lower, at least about 20% lower, at least about 30% lower, or even at least about 40% lower than the specific enthalpy of the activated carbon.

In another characterization, the peak oxidation rate of the sorbent composition is lower than the peak oxidation rate of the activated carbon (i.e., the activated carbon without an effective amount of the passivation agent). In one characterization, the peak oxidation rate of the sorbent composition is at least about 5% lower than the peak oxidation rate of the activated carbon, for example at least about 10% lower than the peak oxidation rate of the activated carbon, for example at least about 20% lower than the peak oxidation rate of the activated carbon, for example, at least about 30% lower than the peak oxidation rate of the activated carbon, for example at least about 40% lower than the peak oxidation rate of the activated carbon, for example at least about 50% lower than the peak oxidation rate of the activated carbon.

The activated carbon sorbent composition according to this embodiment may also include other additives. In one characterization, the sorbent composition comprises an oxidation agent, e.g., to facilitate the oxidation of contaminants, such as mercury, in a flue gas stream. In one particular characterization, the oxidation agent comprises a halogen species. For example, the halogen species may comprise a bromide salt, such as a bromide salt selected from the group consisting of sodium bromide, ammonium bromide, calcium bromide, lithium bromide and magnesium bromide.

In another characterization, the activated carbon sorbent composition comprises substantially free-flowing particulates of the activated carbon, e.g., powdered activated carbon. In one particular characterization, the activated carbon has a median particle size of not greater than about 20 μm. In another characterization, the activated carbon has a median particle size of at least about 6 μm. In another particular characterization, the activated carbon has a median particle size of not greater than about 30 μm, a particle density of at least about 0.4 g/cc, and a total pore volume of at least about 0.2 cc/g. In another particular characterization, the activated carbon has a median particle size of not greater than about 20 μm, a particle density of at least about 0.4 g/cc, and a total pore volume of at least about 0.2 cc/g. In another particular characterization, the activated carbon has a median particle size of not greater than about 15 μm, a particle density of at least about 0.4 g/cc, and a total pore volume of at least about 0.2 cc/g. In another particular characterization, the activated carbon has a median particle size of not greater than about 12 μm, a particle density of at least about 0.4 g/cc, and a total pore volume of at least about 0.2 cc/g.

The sulfur oxide compound may be associated with the activated carbon in a number of ways. In one characterization, the sulfur oxide compound is in the form of a coating on the activated carbon. In another characterization, the sulfur oxide compound is in particulate form and is admixed with the activated carbon.

In another embodiment of this disclosure, a method for the manufacture of an activated carbon sorbent composition is disclosed. The method includes the step of contacting powdered activated carbon with a passivation agent, the passivation agent comprising a sulfur oxide compound, the sulfur oxide compound being selected from the group consisting of: (i) a nonionic sulfur oxide compound defined by the formula $SO_y$, where y=2 or 3; and (ii) an ionic sulfur oxide compound comprising an anion defined by the formula $S_xO_y^{2-}$, where x=1 or 2 and y=2, 3, 4, 5, or 6.

A number of refinements and additional method steps (e.g., characterizations) are applicable to this method for the manufacture of an activated carbon sorbent composition. These refinements and additional steps may be implemented individually or in any combination. As such, each of the following refinements may be, but are not required to be, used with any other refinement or combination of refinements relating to this embodiment of a method for the manufacture of an activated carbon sorbent composition. For example, the activated carbon sorbent composition produced by the method may be an activated carbon sorbent composition in accordance with the foregoing embodiment of a sorbent composition, including any or all of the various characterizations of the sorbent composition.

In one characterization, the contacting step comprises coating the powdered activated carbon with the passivation agent. For example, the coating step may comprise forming a slurry of the activated carbon and the sulfur oxide compound or a precursor to the sulfur oxide compound. In another characterization, the coating step comprises spraying the sulfur oxide compound or a precursor to the sulfur oxide compound onto the activated carbon.

In another characterization, the contacting step may comprise admixing the powdered activated carbon with the sulfur oxide compound or a precursor thereof.

According to another embodiment of this disclosure, a method for removing contaminants from a flue gas stream using a flue gas train is disclosed, where the flue gas train comprises a baghouse unit for particulate matter control. The method includes the steps of burning a combustible material to create a flue gas stream comprising contaminants, contacting the flue gas stream with an activated carbon sorbent composition according to any of the foregoing embodiments and characterizations with the flue gas stream.

DETAILED DESCRIPTION

Figure 1:
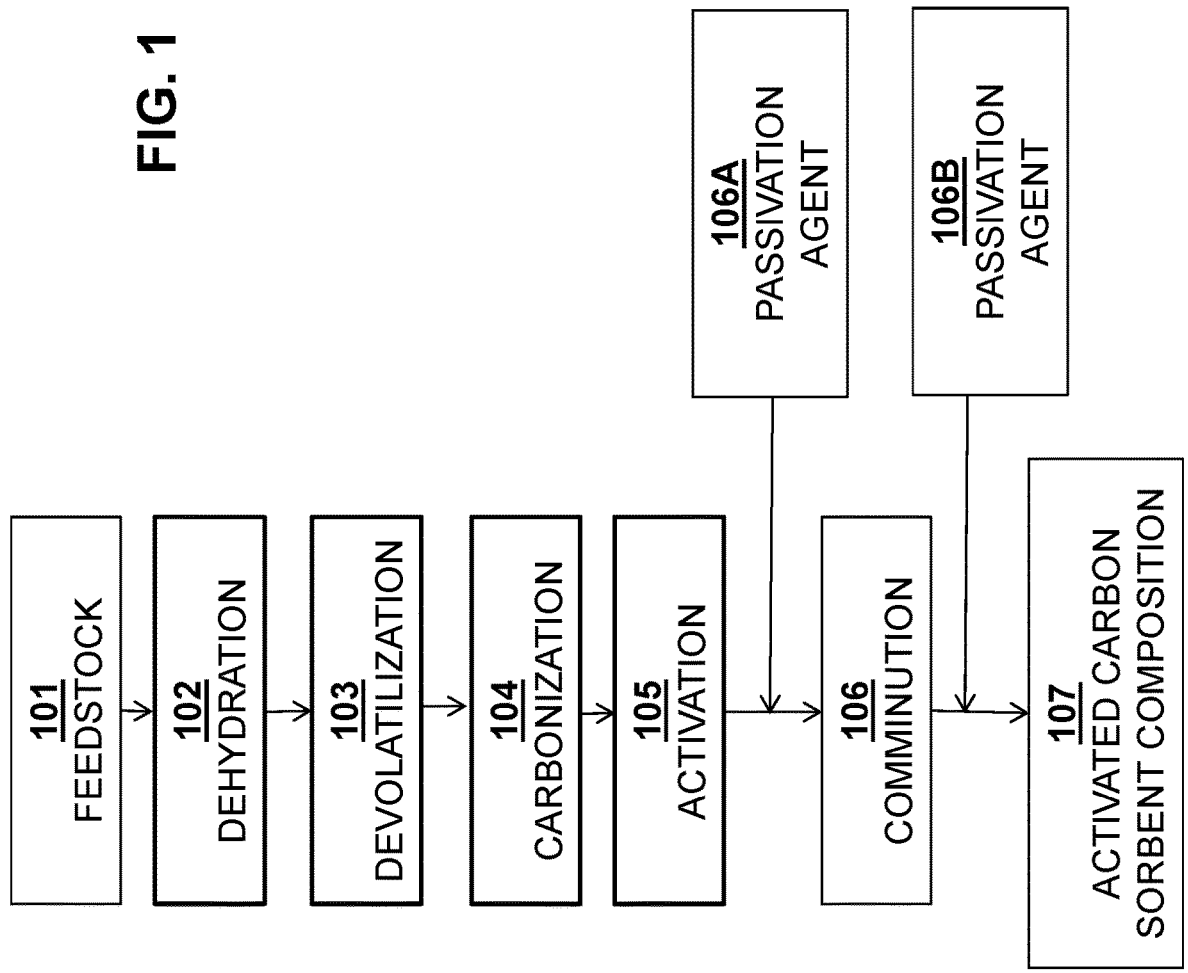
FIG. 1 illustrates a flow sheet for the manufacture of an activated carbon sorbent composition in accordance with the present disclosure.

The present disclosure relates to activated carbon sorbent compositions that include activated carbon and a passivation agent, where the passivation agent is selected to reduce the self-heating and/or the auto-ignition characteristics of the activated carbon.

Activated carbons such as powdered activated carbon (PAC) are known to be useful for the removal (e.g., sequestration) of contaminants such as mercury from fluids such as a flue gas stream emanating from a boiler (e.g., a coal-fired boiler). As is discussed in more detail below, activated carbons may be formed from a variety of feedstocks such as lignite coal, coconut shells, walnut shells and the like.

The activated carbon sorbent composition disclosed herein include activated carbon as a sorbent for the sequestration of contaminants. In a particular characterization of the sorbent composition, the activated carbon is in the form of free-flowing particulates, i.e., particulates that are not substantially combined into a cohesive mass. For example, the activated carbon may comprise PAC. The PAC may have a median (D50) particle size that enables the PAC to be readily injected into a flue gas stream for the efficient sequestration of contaminants from the flue gas stream. Thus, for example, the activated carbon may have a median particle size that is not greater than about 75 µm and is at least about 6 µm. In some embodiments, the median particle size of the activated carbon is not greater than about 50 µm, such as not greater than about 30 µm, such as not greater than about 20 µm, not greater than about 15 µm, or even not greater than about 12 µm. It is found that a relatively small median particle size may advantageously enhance the reaction kinetics of mercury oxidation and sequestration of the oxidized mercury species by the activated carbon. However, activated carbon having a median particle size of less than about 6 µm may be difficult to handle and efficiently deliver to the flue gas stream.

The activated carbon may also be characterized by having a well-controlled particle density. Controlling the particle density correlates to control over the surface area and total pore volume of the activated carbon, which in turn affect mercury capture performance. Particle density may be measured by liquid mercury volume displacement, in which case the result is referred to as the mercury particle density. In this regard, the activated carbon may have a mercury particle density of at least about 0.4 g/cc, such as at least about 0.6 g/cc. Conversely, the mercury particle density of the activated carbon may be not greater than about 0.9 g/cc, such as not greater than about 0.8 g/cc. Particle density may be measured by the Micrometrics AutoPore IV Mercury Porosimeter (Micromeritics Inc., Norcross, Ga., USA).

Particle density may also be measured by sedimentary volume displacement, in which case the result is referred to as the envelope or skeletal particle density. The envelope density refers to the weight of solid carbon per given volume occupied by a solid carbon. In this regard, the envelope particle density of activated carbon may be at least about 0.4 g/cc, such as at least about 0.6 g/cc or at least about 0.7 g/cc. The envelope particle density of the activated carbon may be not greater than about 1.0 g/cc, such as not greater than about 0.9 g/cc, or even not greater than about 0.8 g/cc. Envelope particle density may be measured using a Micromeritics GeoPyc Envelope Density Analyzer (Micrometrics, Inc., Norcross, Ga., USA).

The activated carbon may also may have a high pore volume and a well-controlled distribution of the pores, particularly among the mesopores (i.e., from 20 Å to 500 Å width) and the micropores (i.e., not greater than 20 Å width). It has been found that a well-controlled distribution of micropores and mesopores are desirable for effective removal of mercury from the flue gas stream. In this regard, while not wishing to be bound by any theory, it is believed that the mesopores are the predominate structures for capture and transport of the oxidized mercury species to the micropores, whereas micropores are the predominate structures for sequestration of the oxidized mercury species.

In this regard, the sum of micropore volume plus mesopore volume (e.g., the total pore volume) of the activated carbon may be at least about 0.10 cc/g, such as at least 0.20 cc/g, at least about 0.24 cc/g or even at least about 0.25 cc/g. The micropore volume of the activated carbon may be at least about 0.05 cc/g, such as at least about 0.13 cc/g. Further, the mesopore volume of the activated carbon may be at least about 0.05 cc/g, such as at least about 0.13 cc/g. In one characterization, the ratio of micropore volume to mesopore volume may be at least about 0.7, such as at least about 0.9, and may be not greater than about 1.5. Such levels of micropore volume relative to mesopore volume advantageously enable efficient capture and sequestration of oxidized mercury species, such as $HgCl_2$ or $HgBr_2$, by the activated carbon. Pore volumes may be measured using gas adsorption techniques (e.g., $N_2$ adsorption) using instruments such as a TriStar II Surface Area Analyzer (Micromeritics Instruments Corporation, Norcross, Ga., USA).

Thus, the activated carbon may be characterized by any combination of the above features. In one particular characterization, the activated carbon is powdered activate carbon having a median particle size of not greater than about 30 µm, a particle density of at least about 0.4 g/cc, and a total pore volume of at least about 0.2 cc/g. In another particular characterization, the powdered activated carbon has a median particle size of not greater than about 20 µm, a particle density of at least about 0.4 g/cc, and a total pore volume of at least about 0.2 cc/g. In another particular characterization, the powdered activated carbon has a median particle size of not greater than about 15 µm, a particle density of at least about 0.4 g/cc, and a total pore volume of at least about 0.2 cc/g. In yet another particular characterization, the powdered activated carbon has a median particle size of not greater than about 12 µm, a particle density of at least about 0.4 g/cc, and a total pore volume of at least about 0.2 cc/g.

The activated carbon may also include components that arise naturally from the manufacture of the activated carbon, e.g., when the activated carbon is manufactured from lignite coal. For example, one component of the activated carbon may be minerals found in the feedstock used to manufacture the activated carbon. The minerals may advantageously catalyze the oxidation of the elemental mercury in the flue gas stream. The presence of such minerals may thereby enhance the kinetics of the mercury oxidation such that a reduced contact time with the flue gas stream is required to oxidize and remove sufficient amounts of mercury from the flue gas stream.

The activated carbon may advantageously comprise of minerals including, but not limited to, aluminum-containing minerals, calcium-containing minerals, iron-containing minerals, silicon-containing minerals, silicate-containing minerals, sodium-containing minerals, potassium-containing minerals, zinc-containing minerals, tin-containing minerals, magnesium-containing minerals, and combinations thereof. The minerals may predominantly be oxide-based minerals, such as metal oxide minerals (e.g., CaO, $Fe_2O_3$, $Fe3O4$, FeO, Al2O3), and silicates (e.g., $Al_2SiO5$). In one characterization, the minerals predominantly include metal oxides, particularly aluminum oxides and iron oxides. In another characterization, the minerals include calcium-containing minerals, iron-containing minerals and aluminosilicates. These types of minerals are particularly well adapted to catalyze the oxidation reaction of the mercury. Iron-containing minerals are particularly well adapted to catalyze the oxidation reaction, and in one characterization, the minerals include at least 1 wt. % iron-containing minerals. The minerals are intimately intertwined within the activated carbon within a well-controlled porous structure that facilitates the oxidation, capture and removal of mercury. To provide sufficient reaction activity and rapid oxidation kinetics, the activated carbon may include at least about 20 wt. % of the minerals, such as at least 25 wt. % and even at least about 30 wt. % of the minerals. However, excessive amounts of the minerals in the activated carbon may be detrimental to the capture of mercury. In this regard, the activated carbon may include not greater than about 50 wt. % of the minerals, such as not greater than about 45 wt. %. Advantageously, the activated carbon may include not greater than about 40 wt. % of the minerals, such as not greater than about 35 wt. % of the minerals. The total mineral content may be measured by a TGA701 Thermalgravitmetric Analyzer (LECO Corporation, St. Joseph, Mich.). The specific types and amount of particular minerals may be measured by the Niton XL3t X-Ray Fluorescence (XRF) Analyzer (Thermo Fisher Scientific Inc., Waltham, Mass.).

In addition, the activated carbon may also include an amount of aqueous-based solubilizing medium such as water. The presence of a minimum level of solubilizing medium may advantageously enhance the mass diffusional kinetics of the mercury oxidation and sequestration by solubilizing oxidized mercury species on the sorbent surface, e.g., within the mesopores and micropores. In this regard, the activated carbon may include at least about 2 wt. % of the solubilizing medium, such as at least about 3 wt. % or at least about 6 wt. %. However, the amount of solubilizing medium in the activated carbon should be not greater than about 15 wt. %, such as not greater than about 12 wt. %, or even not greater than about 10 wt. % to avoid interfering with the mercury oxidation reaction(s).

In one embodiment, the activated carbon may include at least about 10 wt. % of the fixed carbon, such as at least about 15 wt. % or even at least about 20 wt. % fixed carbon. The amount of fixed carbon in the activated carbon will typically not exceed about 80 wt. %, such as not greater than about 60 wt. %, or even not greater than about 55 wt. %. Due to a well-controlled pore structure and the presence of the other components in the activated carbon, a relatively low amount of fixed carbon is required for mercury oxidation and sequestration, e.g., a low amount of activated carbon per unit volume of the flue gas stream.

In addition to activated carbon, the activated carbon sorbent compositions disclosed herein include a passivation agent that effectively reduces the self-heating and/or the auto-ignition characteristics of the activated carbon sorbent composition, i.e., as compared to the activated carbon without an effective amount of the passivation agent.

In one embodiment, the passivation agent comprises a sulfur-containing compound. The sulfur-containing compound may be selected from the group consisting of sulfur oxide compound, sulfide compounds, organic sulfur compounds and combinations of these compounds. Among these, sulfur oxide compounds may be particularly effective as a passivation agent. Although described herein as comprising a single compound as the passivation agent, it will be appreciated that the passivation agent may include two or more different compounds, e.g., two or more different sulfur oxide compounds.

Sulfur oxide compounds that are particularly useful as a passivation agent may comprise a nonionic sulfur oxide compound, defined by the formula $SO_y$, wherein y=2 or 3 (e.g., sulfur dioxide and sulfur trioxide), or an ionic sulfur oxide compound comprising an ionic sulfur oxide species (i.e., an anion), defined by the formula $S_xO_y^{2-}$, wherein x=1 or 2 and y=2, 3, 4, 5, or 6. In this case, the compound may include the sulfur oxide anion and a cation, where the cation may be selected from hydrogen, a nitrogen-containing compound, or a metal cation. The nitrogen-containing compound may be ammonium ($NH_4^+$) or an alkylammonium compound, for example. The metal cation may be selected from an alkali metal, an alkaline earth metal, and a transition metal. For example, the cation may be an alkali metal selected from the group consisting of lithium (Li), sodium (Na), and potassium (K). The cation may be an alkaline earth metal selected from the group consisting of magnesium (Mg), calcium (Ca), and barium (Ba). The cation may also be a transition metal cation selected from the group consisting of zinc (Zn), iron (Fe), copper (Cu), nickel (Ni), titanium (Ti), manganese (Mn), aluminum (Al), and vanadium (V). The compound may also be a double salt, i.e., one that comprises two cations, and in one characterization the passivation agent comprises ammonium iron sulfate.

Among sulfur oxide compounds, sulfates may be particularly effective as the passivation agent. Examples of useful sulfate compounds include ammonium sulfate (($NH_4$)$_2SO_4$), ammonium persulfate (($NH_4$)$_2$$S_2$$O_8$), iron II or III sulfate ($FeSO_4$ or $Fe_2(SO_4)_3$), sodium sulfate ($Na_2SO_4$), sodium thiosulfate ($Na_2S_2O_3$), zinc sulfate ($ZnSO_4$), aluminum sulfate ($Al_2(SO_4)_3$) and sulfuric acid ($H_2SO_4$). Sulfites may also be effective passivation agents, such as sodium sulfite ($Na_2SO_3$).

Sulfide compounds that are particularly useful as a passivation agent may be selected from hydrogen sulfide ($H_2S$), sodium sulfide ($Na_2S$), and sodium hydrogen sulfide (NaHS).

Examples of organic sulfur compounds that may be useful for the passivation agent include those selected from the group consisting of urea, thiourea, L-cysteine, mercaptoacetic acid, sodium mercaptoacetate, dimercaptosuccinic acid and N-bromosuccinicimide. Among these, thiourea ($SC(NH_2)_2$) may be particularly effective as a passivation agent.

While not wishing to be bound by any theory, it is believed that the foregoing sulfur-containing compounds at least partially oxidize the activated carbon surface, such that further carbon oxidation reactions are inhibited when the activated carbon is heated to higher temperatures. The passivation agents may interact with the carbon surface via intermolecular forces, van der Waals dispersion forces or dipole-dipole interactions, ionic interactions, steric interactions, or by ionic or non-ionic bonding to the activated carbon surface.

The activated carbon sorbent composition may comprise an admixture of particulate activated carbon (e.g., PAC) and a particulate passivation agent (e.g., a particulate sulfur compound), e.g., an admixture of substantially dry and free-flowing particulates. In one characterization, the passivation agent has a median particle size (D50) that is smaller than the median particle size of the activated carbon.

Although the passivation agent may be admixed with the activated carbon, it may be advantageous to coat the passivation agent onto the activated carbon, such that the passivation agent is on the form of a coating that at least partially coats the activated carbon. In this manner, the amount of passivation agent that is required to effectively passivate the activated carbon surface may be reduced, i.e., as compared to a particle admixture of the activated carbon and the passivation agent. Thus, in one characterization, the sorbent composition includes activated carbon particles and a passivation agent coated onto the activated carbon, i.e., partially or fully coated onto the activated carbon.

In any event, the sorbent composition may comprise an effective amount of passivation agent to passivate the activated carbon and reduce the self-heating and/or auto-ignition properties of the composition. In one characterization, the sorbent composition comprises at least about 0.1 wt. % of the passivation agent, such as at least about 0.5 wt. %, at least about 1 wt. % or even at least about 2 wt. % of the passivation agent. Further, the concentration of the passivation agent should not be so high as to substantially interfere with the sequestration of mercury species by the activated carbon. Thus, in another characterization, the sorbent composition includes not greater than about 40 wt. % of the passivation agent, such as not greater than about 20 wt. % of the passivation agent, such as not greater than about 10 wt. % of the passivation agent or even not greater than about 5 wt. % of the passivation agent.

The activated carbon sorbent composition may include other material components in addition to the activated carbon and the passivation agent. In one embodiment, the activated carbon sorbent composition also includes one or more oxidation agents that may improve the adsorption of mercury from a flue gas stream. Oxidation agents may include halogen salts such as inorganic halogen salts, which may include bromine compounds such as bromides, bromates or hypobromites, iodine compounds such as iodides, iodates or hypoiodites, or chlorine compounds such as chlorides, chlorates or hypochlorites. The inorganic halogen salt may be an alkali metal or an alkaline earth element containing halogen salt where the inorganic halogen salt is associated with an alkali metal such as lithium, sodium, and potassium or alkaline earth metal such as magnesium, and calcium. Non-limiting examples of inorganic halogen salts including alkali metal and alkali earth metal counterions include calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, potassium chloride, potassium bromide, potassium iodide, and the like. The oxidation agents may be optionally included in the composition at any concentration, such as at least about 0.1 wt. % and not greater than about 20 wt. %., such as not greater than about 15 wt. %.

In some examples, the activated carbon sorbent composition may further include an acid gas agent such as, for example, an alkaline compound. Numerous alkaline agents are known in the art and currently used to remove sulfur oxide species from flue gas and any such alkaline agent may be used. For example, in various embodiments, the alkaline additive may be alkali oxides, alkaline earth oxides, hydroxides, carbonates, bicarbonates, phosphates, silicates, aluminates, and combinations thereof, and in certain embodiments, the alkaline agent may be calcium carbonate ($CaCO_3$), calcium oxide (CaO), calcium hydroxide (Ca$(OH)_2$), magnesium carbonate ($MgCO_3$), magnesium hydroxide ($Mg(OH)_2$), magnesium oxide (MgO), sodium carbonate ($Na_2CO_3$), sodium bicarbonate ($NaHCO_3$), trisodium hydrogendicarbonate dihydrate ($Na_3(CO_3)(HCO_3)$·$2H_2O$), and combinations thereof. Such acid gas agents are disclosed in more detail in commonly-owned U.S. patent application Ser. No. 14/142,636 (published as U.S. Patent Application Publication No. 2014/0191157) by Wong et al., which is incorporated herein by reference in its entirety.

Activated carbons such as PAC may be manufactured from various sources of carbon including plant sources such as coconut and/or walnut shells or coal sources such as lignite coal. No matter the carbon source, the method for manufacture of activated carbon may typically be characterized by four primary steps. FIG. 1 is a flow sheet that illustrates these steps. The manufacturing process illustrated in FIG. 1 may begin with a carbonaceous feedstock 101 such as low-rank lignite coal with a relatively high content of native minerals. In the manufacturing process, the feedstock 101 is subjected to an elevated temperature and one or more oxidizing gases under exothermic conditions for a period of time to sufficiently increase surface area, create porosity, alter surface chemistry, and expose and exfoliate native minerals previously contained within feedstock 101. The specific steps in the process may include: (1) dehydration 102, where the feedstock 101 is heated to remove the free and bound water, typically occurring at temperatures ranging from 100° C. to 150° C.; (2) devolatilization 103, where free and weakly bound volatile organic constituents are removed, typically occurring at temperatures above about 150° C.; (3) carbonization 104, where non-carbon elements continue to be removed and elemental carbon is concentrated and transformed into random amorphous structures, typically occurring at temperatures of from about 350° C. to about 800° C.; and (4) activation 105, where steam, air, and/or other oxidizing agent(s) is added and pores are developed to produce a particulate GAC, typically occurring at temperatures above about 800° C.

The manufacturing process may be carried out, for example, in a multi-hearth or rotary furnace. The manufacturing process is not discrete and steps can overlap and use various temperatures, gases, and residence times within each step to promote desired surface chemistry and physical characteristics of the manufactured product.

After activation 105, the granular activated carbon (GAC) may be subjected to a comminution step 106 to reduce the particle size (e.g., reduce the median particle size) of the GAC product. Comminution 106 may occur, for example, in a mill such as a roll mill, jet mill or other like process. Comminution 106 may be carried out for a time sufficient to reduce the median particle size to form PAC from the thermally treated GAC, e.g., for a time sufficient to reduce the median particle size to less than about 1.0 mm.

According to an embodiment of the present disclosure, a passivating step is implemented by contacting the activated carbon (e.g., the PAC) with the passivation agent, e.g., following the activation step 105, as in step 106A. The passivation agent may be contacted with the activated carbon by various methods thereby forming an activated carbon sorbent composition 107. For example, the passivation agent in a gas, liquid (e.g., pure or in solution), or solid form may be mixed with, impregnated in and/or coated onto the GAC as it exits the activation furnace, before 106A comminution 106, for example directly following activation or after cooling of the GAC. Alternatively, or in addition to, the passivation agent may likewise be mixed with, impregnated in and/or coated onto the activated carbon after 106B the comminution step 106, e.g., may be mixed with, impregnated in, or coated onto the powdered activated carbon.

In one particular embodiment, the passivation agent is coated onto the activated carbon (e.g., onto the PAC). For example, one or more precursors (e.g., precursor salts) to the passivation agent may be dissolved in a solvent (e.g., water) to form a solution. The solution may then be coated onto the activated carbon, such as by spraying the solution onto the activated carbon and thereafter drying the activated carbon to leave a coating of the passivation agent on the carbon surface. Alternatively, the passivation agent may be coated onto the sorbent by mixing the activated carbon with the solution containing the passivation agent (e.g., forming a slurry) and then separating the activated carbon from the solution and drying the activated carbon to leave a coating of the passivation agent on the carbon. While not wishing to be bound by any theory, it is believed that coating the passivation agent onto the activated carbon in the foregoing manner facilitates the reaction of the passivation agent with the surface of the carbon. Depending on the passivation agent employed there may be advantages to selecting one or the other method of coating the carbon. For example, coating via a spray coating may produce a composition with different characteristics or properties than coating via a liquid based slurry.

In addition, the activated carbon sorbent composition including a passivation agent may be formed by admixing or coating a precursor to the passivation agent (e.g., a precursor to a sulfur compound) with or onto the activated carbon. The sorbent composition may then be treated (e.g., heat treatment or chemical treatment) to convert the precursor to the passivation agent into the passivation agent.

The activated carbon sorbent composition disclosed herein may exhibit reduced self-heating and/or auto-ignition properties, as evidenced by a reduced specific enthalpy and/or oxidation rate, i.e., as compared to the activated carbon without an effective amount of the passivation agent. To measure the specific enthalpy and oxidation rate, differential scanning calorimetry (DSC) may be used. For example, a TA Q2000 DSC calorimeter (TA Instruments, New Castle, Del.) using heat flow measurements, may be employed. The specific enthalpy may be calculated when heat is released by a material undergoing a chemical reaction, for example upon oxidation. DSC may be used to detect the heat released after the environment changes from an inert atmosphere to one that contains oxygen at a certain temperature, e.g., about 150° C. In an activated carbon sorbent composition including a passivation agent, the specific enthalpy should be less than the untreated activated carbon such that less heat is released and therefore less heat is stored in the sample. In the test method utilized to report specific enthalpy values herein, the samples (e.g., about 10 mg to 15 mg samples) are equilibrated at 20° C. and then heated to 120° C. at a rate of about 10° C. per minute. This temperature is maintained for about 2 min, and then heating continues to about 150° C. at a rate of about 10° C./min. The sample is held at this temperature for about 2 min. The atmosphere is then changed from nitrogen to air and the sample is kept at a constant temperature of about 150° C. for about 20 min. The gas flow rate of the nitrogen or air is about 50 mL/min.

Specific enthalpy is calculated by the instrument. Oxidation rates are found from the derivative heat flow curve, which is also calculated by the instrument. The initial oxidation rate is the oxidation rate calculated at 0.05 min (3 seconds) after the atmosphere change from nitrogen to air when the sample starts to release heat. The peak oxidation rate is the highest oxidation rate occurring during the oxidation reaction in the presence of air.

One useful measure of the efficacy of the passivation agents disclosed herein is to compare the specific enthalpy of the (untreated) activated carbon, i.e., the specific enthalpy of a composition that consists essentially of the activated carbon sorbent, to the specific enthalpy of the activated carbon composition, e.g., after the addition of the passivation agent. In one example, the specific enthalpy of the activated carbon composition comprising the passivation agent is at least about 5% less than the specific enthalpy of the activated carbon sorbent. For example, the specific enthalpy of the activated carbon composition may be at least about 10%, such as at least about 20%, at least about 30%, at least about 40%, or even at least about 50% less than the specific enthalpy of the activated carbon sorbent.

Another useful measure of the efficacy of the passivation agents disclosed herein is to compare the peak oxidation rate of the (untreated) activated carbon, i.e., the peak oxidation rate of a composition that consists essentially of the activated carbon sorbent, to the peak oxidation rate of the activated carbon sorbent composition, e.g., after the addition of the passivation agent. In one example, the peak oxidation rate of the activated carbon sorbent composition comprising the passivation agent is at least about 5% less than the peak oxidation rate of the activated carbon sorbent. For example, the peak oxidation rate may be at least about 10%, such as at least about 20%, at least about 30%, at least about 40%, or even at least about 50% less than the peak oxidation rate of the activated carbon sorbent.

The activated carbon sorbent compositions are particularly useful for removal of contaminants, especially mercury, from flue gas streams. It is an advantage of the activated carbon sorbent compositions disclosed herein that the passivation agent(s) do not substantially inhibit the ability of the activated carbon to sequester mercury. The ability to capture mercury may be measured by a dynamic mercury index (DMI) test that measures mercury (Hg) captured in micro-grams of Hg per gram of activated carbon composition (μg Hg/g activated carbon composition). An increase in, or higher DMI, or μg Hg/g carbon (μg/g) captured, is an indication of a higher mercury capture efficiency of a sorbent. This test simulates conditions in a coal burning facility's flue gas stream. The test system includes a preheater, carbon feed, mercury feed, and reaction chamber. The mercury is fed into a reactor chamber along with carbon, wherein they are entrained. Uncaptured mercury is analyzed and DMI calculated. Temperature of the entrained mercury and carbon is kept at about 325° F. (163° C.). Air entrainment and injection rates of between about 1 and about 5 lb/MMacf (one million actual cubic feet) are maintained such that residence time of the carbon in the reaction chamber is about one second to simulate electrical generation unit (EGU) facility conditions. The mercury concentration in the system is approximately 10 μg/m$^3$.

In one example, the DMI of the activated carbon sorbent compositions disclosed herein is at least about 40 μg/g, such as at least about 100 μg/g, at least about 150 μg/g, at least about 200 μg/g, at least about 250 μg/g, at least about 300 μg/g, or even at least about 400 μg/g.

In one embodiment, a method for treating flue gas streams using an activated carbon sorbent composition such as those disclosed herein can be characterized by three primary steps, which may occur sequentially or simultaneously: (1) contact of the sorbent composition, e.g., including an activated carbon such as PAC, with the mercury species, which is typically present in very dilute concentrations in the flue gas (e.g., <100 parts Hg per billion); (2) conversion of elemental mercury (i.e., $Hg^0$), which is relatively inert and not easily adsorbed, into an oxidized mercury species (e.g., $Hg^+$ and $Hg^{+2}$), which is more readily adsorbed and is significantly more soluble in an aqueous solubilizing medium such as water; and (3) the diffusion of the oxidized mercury species into pores where it is held tightly (e.g., sequestered) without being released. The flue gas streams traverse the ductwork at very high velocities, such as in excess of about 25 feet/second (7.6 m/s). Therefore, once injected, the sorbent must rapidly accomplish these three steps to contact, oxidize, and sequester the mercury species. In some instances, the sorbent only has a residence time of 1 to 2 seconds in the flue gas.

Figure 2:
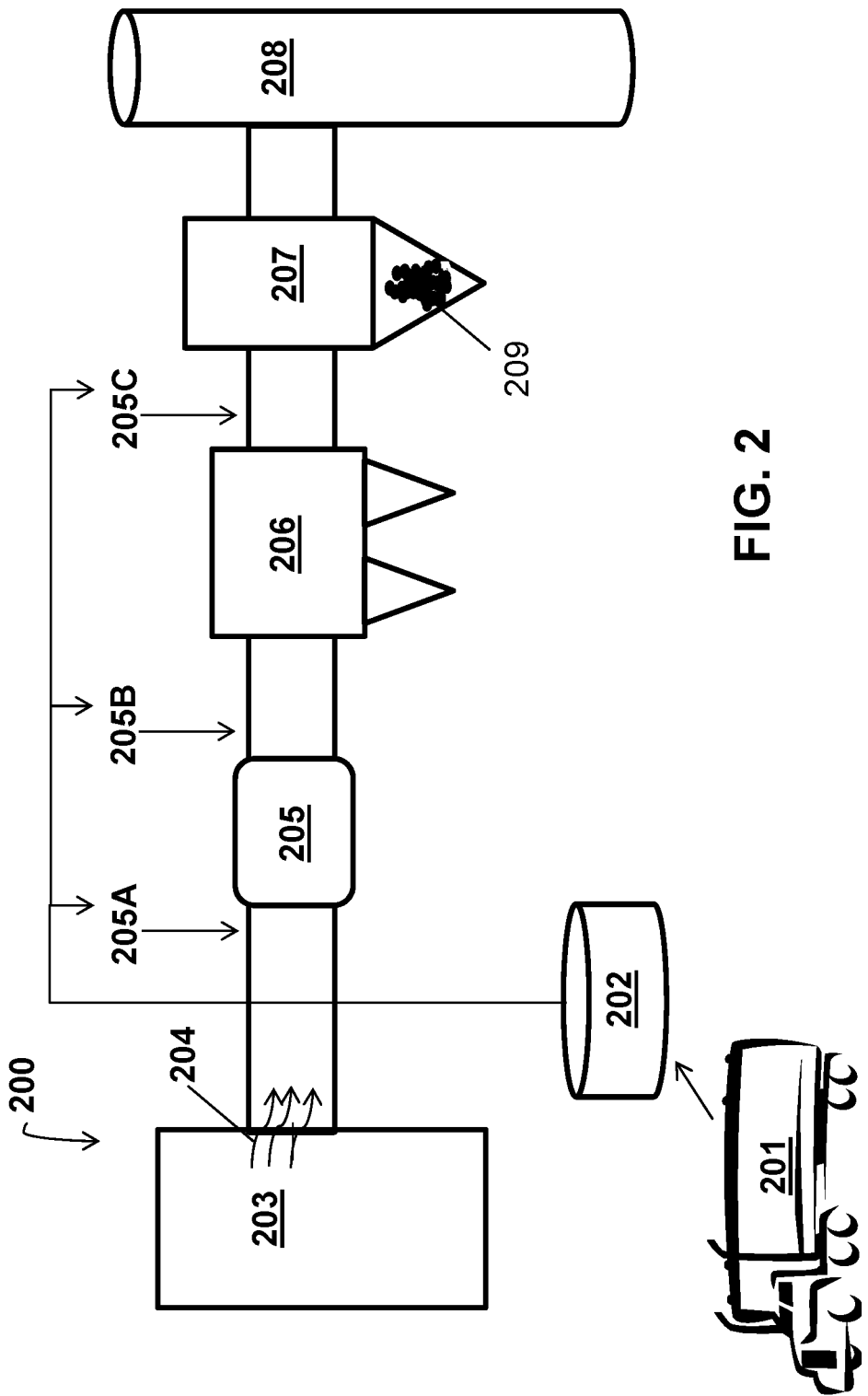
FIG. 2 illustrates a plant configuration and method for the capture and sequestration of contaminants from a flue gas stream in accordance with the present disclosure.

Typical processing and a method for treatment of a flue gas stream with an activated carbon sorbent composition at a coal burning facility or industrial boiler is represented in FIG. 2. The activated carbon sorbent composition may be shipped via truck 201 or rail car to a coal burning facility 200. The activated carbon sorbent composition is kept in a silo 202 until it is contacted with the flue gas stream. It is at these as well as other points, described hereafter, that the possibility for self-heating and/or auto-ignition of the sorbent composition is increased due to the amount being transported and stored.

As illustrated in FIG. 2, for power or heat generation as in coal-fired plants or industrial boiler plants, a boiler 203 where coal is combusted (e.g., burned) produces a flue gas stream 204. As illustrated in FIG. 2, the flue gas stream 204 may proceed to an air heater unit 205 where the temperature of the flue gas stream 204 is reduced. Thereafter, the flue gas stream 204 may be introduced to a separation unit such as an electrostatic precipitator (ESP) 206 and/or a fabric filter baghouse unit (BH unit) 207, each of which removes particulate matter from the flue gas, before exiting out a stack 208. For example, a cold-side (i.e., after the air heater unit 205) ESP 206 and/or BH unit 207 can be used. It will be appreciated by those skilled in the art that the plant may include other devices not illustrated in FIG. 2, such as a selective catalytic reduction unit (SCR) and the like, e.g. a wet or dry scrubber, and may have numerous other configurations.

In order to capture mercury from the flue gas, an activated carbon sorbent composition may be transported via air entrainment and contacted with (e.g., injected into) the flue gas stream 204 either before 205A or after 205B the air heater unit 205, but before the ESP 206 which will remove the sorbent composition from the flue gas. More recently TOXECON™ systems have become popular because they allow facilities to sell the ash from the combusted coal to concrete manufacturers. These systems use an ESP 206 upstream from BH units 206 with sorbent injection 205C occurring after the ESP 206 but before the BH unit 207 such that the ash is captured by the ESP 206 and can be sold for concrete production. Injection of an activated carbon sorbent composition upstream 205C of the BH unit 207 functions to sequester mercury and other contaminants, and the activated carbon sorbent composition is then removed from the flue stream in the BH unit 207 before emission from the stack 208. Because it is not diluted with fly ash, activated carbon not entrained and captured by the filter bags of the BH unit 207 may accumulate in a hopper 209 of the BH unit 207. The sorbent compositions disclosed herein may have a reduced propensity to self-ignite due to absorption of oxygen, especially when the outside ambient temperature is high.

EXAMPLES

Example 1

A comparative sample, Sample A, comprised of an activated carbon derived from a lignite coal feedstock is prepared substantially as described in relation to FIG. 1 above. Following activation, the comminution step is conducted until the resulting PAC is characterized as having a median particle size (D50) of about 12 μm, a surface area of at least about 350 m$^2$/g, a particle density of at least about 0.3 g/cc, and a total pore volume of at least about 0.3 cc/g. Enthalpy, initial and peak oxidation rate of comparative Sample A is tested as described above and the results are provided in Table 1. Further, the ability to capture mercury is assessed using the DMI test, and this result is provided in Table 2. Sample A does not include an oxidizing agent.

Example 2

To test for reduced self-heating and reduced auto-ignition properties of the activated carbon compositions disclosed herein, a sulfur oxide passivation agent, here being sulfuric acid ($H_2SO_4$), is added to comparative Sample A to form Sample B. For preparation of Sample B, 10.18 ml of a 1.77 wt. % sulfuric acid solution is sprayed onto 50 g of Sample A while fluidizing for 30 minutes (min.) The sprayed sample is dried at about 150° C. for about 2 hours (h) to yield an activated carbon composition comprising about 0.5 wt. % $H_2SO_4$. Enthalpy, initial and peak oxidation rates of Sample B are tested as described above and are listed in Table 1. Further, the ability to capture mercury is assessed in the DMI test and this result is listed in Table 2.

Example 3

To test for reduced self-heating and reduced auto-ignition properties of the activated carbon sorbent compositions disclosed herein, a sulfur oxide passivation agent, here being iron (III) sulfate ($Fe_2(SO_4)_3$), is added to comparative Sample A to form Sample C. For preparation of Sample C, 12.5 ml of a 20 wt. % iron (III) sulfate solution is sprayed onto 50 g of comparative Sample A while fluidizing for 30 min. The sprayed sample is dried at about 150° C. for about 2 h to yield an activated carbon sorbent composition comprising about 0.5 wt. % $Fe_2(SO_4)_3$. Enthalpy, initial and peak oxidation rates of Sample C are tested as described above and are listed in Table 1. Further, the ability to capture mercury is assessed in the DMI test and this result is listed in Table 2.

Example 4

To test for reduced self-heating and reduced auto-ignition properties of the activated carbon sorbent compositions disclosed herein, a sulfur oxide passivation agent, here being sodium sulfite ($Na_2SO_3$), is added to comparative Sample A to form Sample D. For preparation of Sample D, 12.5 ml of a 20 wt. % sodium sulfite solution is sprayed onto 50 g of comparative Sample A while fluidizing for 30 min. The sprayed sample is dried at about 150° C. for about 2 h, to yield an activated carbon sorbent composition comprising about 5 wt. % $Na_2SO_3$. Enthalpy, initial and peak oxidation rates of Sample D are tested as described above and are listed in Table 1. Further, the ability to capture mercury is assessed in the DMI test and this result is listed in Table 2.

Example 5

To test for reduced self-heating and reduced auto-ignition properties of the activated carbon sorbent compositions disclosed herein, a sulfur oxide passivation agent, here being ammonium persulfate ($(NH_4)_2S_2O_8$), is added to comparative Sample A to form Sample E. For preparation of Sample E, 12.1 ml of a 17.3 wt. % ammonium persulfate solution is sprayed onto 50 g of comparative Sample A while fluidizing for 30 min. The sprayed sample is dried at about 150° C. for about 2 h, to yield an activated carbon sorbent composition comprising about 4 wt. % $(NH_4)_2S_2O_8$. Enthalpy, initial and peak oxidation rates of Sample E are tested as described above and are listed in Table 1. Further, the ability to capture mercury is assessed in the DMI test and this result is listed in Table 2.

Example 6

To test for reduced self-heating and reduced auto-ignition properties of the activated carbon sorbent compositions, a sulfur oxide passivation agent, here being sodium sulfate ($Na_2SO_4$), is added to comparative Sample A to form Sample F. For preparation of Sample F, 12.8 ml of a 21 wt. % sodium sulfate solution is sprayed onto 50 g comparative Sample A while fluidizing for 30 min. The sprayed sample is dried at about 150° C. for 2 h, to yield an activated carbon composition comprising about 5 wt. % $Na_2SO_4$. Enthalpy, initial and peak oxidation rates of Sample F are tested as described above and are listed in Table 1. Further, the ability to capture mercury is assessed in the DMI test and this result is listed in Table 2.

Example 7

To test for reduced self-heating and reduced auto-ignition properties of the activated carbon sorbent compositions, a sulfur oxide passivation agent, here being sodium thiosulfate ($Na_2S_2O_3$), is added to comparative Sample A to form Sample G. For preparation of Sample G, 11.5 ml of a 12 wt. % sodium thiosulfate solution is sprayed onto 50 g of comparative Sample A while fluidizing for 30 min. The sprayed sample is dried at about 150° C. for about 2 h, to yield an activated carbon sorbent composition comprising about 3 wt. % $Na_2S_2O_3$. Enthalpy, initial and peak oxidation rates of Sample G are tested as described above and are listed in Table 1. Further, the ability to capture mercury is assessed in the DMI test and this result is listed in Table 2.

Example 8

To test for reduced self-heating and reduced auto-ignition properties of the activated carbon sorbent compositions, a sulfur oxide passivation agent, here being zinc sulfate ($ZnSO_4$), is added to comparative Sample A to form Sample H. For preparation of Sample H, 13.2 ml of a 25 wt. % zinc sulfate solution is sprayed onto 50 g of comparative Sample A while fluidizing for 30 min. The sprayed sample is dried at about 150° C. for about 2 h, to yield an activated carbon sorbent composition comprising about 6 wt. % $ZnSO_4$. Enthalpy, initial and peak oxidation rates of Sample H are tested as described above and are listed in Table 1. Further, the ability to capture mercury is assessed in the DMI test and this result is listed in Table 2.

Example 9

To test for reduced self-heating and reduced auto-ignition properties of the activated carbon sorbent compositions, a sulfur oxide passivation agent, here being ammonium sulfate ($(NH_4)_2SO_4$), is added to comparative Sample A to form Sample I. For preparation of Sample I, 30.5 ml of a 34.4 wt. % ammonium sulfate solution is sprayed onto 100 g of comparative Sample A while fluidizing for 30 min. The sprayed sample is dried at about 150° C. for about 2 h, to yield an activated carbon composition comprising about 9.5 wt. % $(NH_4)_2SO_4$. Enthalpy, initial and peak oxidation rates of Sample I are tested as described above and are listed in Table 1. Further, the ability to capture mercury is assessed in the DMI test and this result is listed in Table 2.

Example 10

To test for reduced self-heating and reduced auto-ignition properties of the activated carbon compositions, a sulfur oxide passivation agent, here being aluminum sulfate ($Al_2(SO_4)_3$), is added to comparative Sample A to form Sample J. For preparation of Sample J, 12.1 ml of a 17.7 wt. % aluminum sulfate solution is sprayed onto 50 g of comparative Sample A while fluidizing for about 30 min. The sprayed sample is dried at about 150° C. for about 2 h, to yield an activated carbon composition comprising about 4 wt. % $Al_2(SO_4)_3$. Enthalpy, initial and peak oxidation rates of Sample J are tested as described above and are listed in Table 1. Further, the ability to capture mercury is assessed in the DMI test and this result is listed in Table 2.

Example 11

To test for reduced self-heating and auto-ignition properties of the activated carbon compositions, a sulfur oxide passivation agent, here being iron (II) sulfate ($FeSO_4$), is added to comparative Sample A to form Sample K. For preparation of Sample K, 15.3 ml of a 34 wt. % aluminum sulfate solution is sprayed onto 50 g of comparative Sample A while fluidizing for about 30 min. The sprayed solution is dried at about 150° C. for about 2 h, to yield an activated carbon composition comprising about 9 wt. % $FeSO_4$. Enthalpy, initial and peak oxidation rate of Sample K is tested as described above and is listed in Table 1. Further, the ability to capture mercury is assessed in the DMI test and this result is listed in Table 2.

Example 12

To test for reduced self-heating and auto-ignition properties of the activated carbon compositions, a sulfide passivation agent, here being sodium hydrogen sulfide (NaHS), is added to comparative Sample A to form Sample L. For preparation of Sample L, 16.7 ml of a 30 wt. % solution of hydrogen sulfide in water is sprayed onto 100 g of comparative Sample A while fluidizing. The sprayed sample is dried at about 150° C. for about 2 h, to yield an activated carbon composition with approximately 5 wt. % NaHS. Enthalpy, initial and peak oxidation rates of Sample L are tested as described above and are listed in Table 1. Further, the ability to capture mercury is assessed in the DMI test and this result is listed in Table 2.

Example 13

To test for reduced self-heating and auto-ignition properties of the activated carbon compositions, a sulfide passivation agent, here being sodium sulfide ($Na_2S$), is added to comparative Sample A to form Sample M. For preparation of Sample M, 33.3 ml of a 15 wt. % solution of sodium sulfide in water is sprayed onto 100 g of comparative Sample A while fluidizing. The sprayed sample is dried at about 150° C. for about 2 h to yield an activated carbon composition comprising about 5 wt. % $Na_2S$. Enthalpy, initial and peak oxidation rates of Sample M are tested as described above and are listed in Table 1. Further, the ability to capture mercury is assessed in the DMI test and this result is listed in Table 2.

Example 14

To test for reduced self-heating and auto-ignition properties of the activated carbon compositions, an organic passivation agent, here being thiourea ($SC(NH_2)_2$), is added to comparative Sample A to form Sample N. For preparation of Sample N, 50 g of a 10 wt. % solution of the thiourea in water is sprayed onto 100 g of comparative Sample A while fluidizing as and dried at about 150° C. for about 2 h to yield an activated carbon composition comprising about 5 wt. % thiourea. Enthalpy, initial and peak oxidation rates of Sample N are tested as described above and are listed in Table 1. Further, the ability to capture mercury is assessed in the DMI test and this result is listed in Table 2.

Example 15

As disclosed in U.S. Pat. App. Pub. No. 2013/0109562 (now U.S. Pat. No. 9,539,538) by Wong et al., which is incorporated herein by reference in its entirety, halogens in the form of halide salts may be used to enhance oxidation reaction kinetics and mass diffusion of mercury species on a sorbent. To test whether addition of a halide salt affected passivation, Sample I, having 9.5 wt. % $(NH_4)_2SO_4$ as described above in Example 9, is further treated with a halide salt, here being sodium bromide (NaBr), to form Sample O. For preparation of Sample O, a sodium bromide solution is sprayed on to 50 g of Sample I while fluidizing for about 30 min. The sprayed sample is dried at about 150° C. for about 2 h to yield an activated carbon composition comprising about 8.1 wt. % $(NH_4)_2SO_4$ and about 10 wt. % Br. Enthalpy, initial and peak oxidation rates of Sample O are tested as described above and are listed in Table 1. Further, the ability to capture mercury is assessed in the DMI test and this result is listed in Table 2.

TABLE 1

Specific Enthalpy and Oxidation Rates

| Sample | Specific Enthalpy (J/g) | Initial oxidation rate (W/g · min) | Peak oxidation rate (W/g · min) |
| --- | --- | --- | --- |
| A | 4.65 | 0.42 | 0.61 |
| B | 2.34 | 0.15 | 0.21 |
| C | 2.16 | 0.17 | 0.19 |
| D | 2.5 | 0.19 | 0.23 |
| E | 1.78 | 0.15 | 0.18 |
| F | 2.42 | 0.19 | 0.24 |
| G | 3.48 | 0.29 | 0.35 |
| H | 2.97 | 0.24 | 0.32 |
| I | 2.23 | 0.15 | 0.22 |
| J | 2.25 | 0.14 | 0.27 |
| K | 2.29 | 0.04 | 0.09 |
| L | 4.95 | 0.23 | 0.37 |
| M | 4.47 | 0.36 | 0.54 |
| N | 1.86 | 0.10 | 0.15 |
| O | 3.46 | 0.05 | 0.20 |

TABLE 2

Mercury Capture by Activated Carbon Sorbent Compositions

| Sample | Mercury Capture (µg/g) |
| --- | --- |
| A | 20 |
| B | 433 |
| C | 300 |
| D | 307 |
| E | 448 |
| F | 388 |
| G | 144 |
| H | 92 |
| I | 282 |
| J | 90 |
| K | 224 |
| L | 44 |
| M | 11 |
| N | 104 |
| O | 369 |

As shown in Table 1, self-heating and auto-ignition properties are reduced by addition of the passivation agents to activated carbon. Specifically, the specific enthalpy, initial oxidation rate, and/or peak oxidation rate of the example compositions comprising the passivation agents are reduced, in most cases significantly, as compared to the comparative untreated activated carbon Sample A. Addition of a halide salt raised the enthalpy as compared to a sample with only passivation agent added, but the peak oxidation rate is similar to the sample having only the passivation agent.

Furthermore, as shown in Table 2, many of the passivation agents also improve mercury capture performance in the gas phase as compared to the non-treated activated carbon comparative Sample A. As indicated previously a higher DMI, or µg Hg/g carbon removed, indicates increased mercury capture efficiency of the sample.

While various embodiments of an activated carbon composition, a method for making an activated carbon composition, and a method for treating a flue gas with an activated carbon composition have been described in detail, it is apparent that modifications and adaptations of those embodiments will occur to those skilled in the art. However, is to be expressly understood that such modifications and adaptations are within the spirit and scope of the present disclosure.

What is claimed is:

1. A method for sequestering contaminants from a flue gas stream traversing a flue gas train, the flue gas train comprising a particulate collection device selected from a baghouse, an electrostatic precipitator, and combinations thereof, the method comprising:
burning a combustible material to form a flue gas stream comprising contaminants, the contaminants comprising at least mercury;
injecting free-flowing particulates of a particulate activated carbon sorbent composition into the flue gas stream to sequester at least a portion of the contaminants with the particulate activated carbon sorbent composition; and
capturing at least a portion of the particulate activated carbon sorbent composition in the particulate collection device,
wherein the particulate activated carbon sorbent composition comprises a powdered activated carbon having a median particle size of not greater than about 30 μm and at least about 0.1 wt. % and less than about 20 wt % of a passivation agent, the passivation agent comprising a sulfur oxide compound comprising an anion defined by a formula $S_xO_y^{2-}$, where x=2 and y=3, 4, 5, 6, or 8, and a cation selected from the group consisting of hydrogen, aluminum, a nitrogen-containing compound, a transition metal, and an alkaline earth metal.

2. The method recited in claim 1, wherein the combustible material comprises coal.

3. The method recited in claim 1, wherein the sulfur oxide compound is in the form of a coating on the powdered activated carbon.

4. The method recited in claim 1, wherein the sulfur oxide compound comprises sulfur oxide compound particulates that are admixed with the powdered activated carbon.

5. The method recited in claim 1, wherein the particulate collection device is a baghouse.

6. The method recited in claim 1, wherein the particulate collection device is an electrostatic precipitator.

7. The method recited in claim 1, wherein the cation is hydrogen.

8. The method recited in claim 1, wherein the powdered activated carbon has a median particle size of not greater than about 15 μm, a particle density of at least about 0.4 g/cc, and a total pore volume of at least about 0.2 cc/g.

9. The method recited in claim 1, wherein the cation is a nitrogen-containing compound.

10. The method recited in claim 9, wherein the nitrogen-containing compound is ammonium.

11. The method recited in claim 10, wherein the sulfur oxide compound is ammonium persulfate.

12. The method recited in claim 1, wherein a peak oxidation rate of the particulate activated carbon sorbent composition is at least about 10% lower than a peak oxidation rate of the powdered activated carbon.

13. The method recited in claim 1, further comprising an oxidation agent.

14. The method recited in claim 13, wherein the oxidation agent comprises a halogen species.

15. The method recited in claim 14, wherein the halogen species comprises a bromide salt.

16. The method recited in claim 15, wherein the bromide salt is selected from the group consisting of sodium bromide, ammonium bromide, calcium bromide, lithium bromide and magnesium bromide.

17. The method recited in claim 14, wherein the halogen species comprises an iodine compound selected from the group consisting of iodides, iodates and hypoiodites.

18. The method recited in claim 1, wherein the cation is an alkaline earth metal.

19. The method recited in claim 18, wherein the alkaline earth metal is selected from the group consisting of magnesium, calcium, and barium.

20. The method recited in claim 1, wherein the cation is a transition metal.

21. The method recited in claim 20, wherein the cation is selected from the group consisting of zinc, iron, copper, nickel, titanium, manganese, and vanadium.

22. The method recited in claim 20, wherein the cation is zinc.

23. The method recited in claim 20, wherein the cation is iron.

24. The method recited in claim 1, wherein the cation is aluminum.

25. The method recited in claim 1, wherein the powdered activated carbon has a median particle size of not greater than about 20 μm, a particle density of at least about 0.4 g/cc and not greater than about 0.9 g/cc.

26. The method recited in claim 1, wherein the particulate activated carbon sorbent composition comprises at least about 0.5 wt. % of the sulfur oxide compound.

27. The method recited in claim 1, wherein the powdered activated carbon has a median particle size of at least about 6 μm.

28. The method recited in claim 1, wherein the powdered activated carbon has a particle density of at least about 0.4 g/cc, and a total pore volume of at least about 0.2 cc/g.

29. The method recited in claim 1, wherein the particulate activated carbon sorbent composition comprises not greater than about 10 wt. % of the sulfur oxide compound.

30. The method recited in claim 1, wherein the particulate activated carbon sorbent composition comprises not greater than about 5 wt. % of the sulfur oxide compound.

31. The method recited in claim 1, wherein the powdered activated carbon has a median particle size of not greater than about 20 μm.

32. The method recited in claim 1, wherein a peak oxidation rate of the particulate activated carbon sorbent composition is at least about 40% lower than a peak oxidation rate of the powdered activated carbon.

33. The method recited in claim 1, wherein a specific enthalpy of the particulate activated carbon sorbent composition is at least about 20% lower than a specific enthalpy of activated carbon.

34. The method recited in claim 1, wherein a specific enthalpy of the particulate activated carbon sorbent composition is at least about 30% lower than a specific enthalpy of the powdered activated carbon.

35. The method recited in claim 1, wherein a specific enthalpy of the particulate activated carbon sorbent composition is at least about 10% lower than a specific enthalpy of the powdered activated carbon.

36. The method recited in claim 1, wherein a peak oxidation rate of the particulate activated carbon sorbent composition is at least about 20% lower than a peak oxidation rate of the powdered activated carbon.

37. The method recited in claim 1, wherein a peak oxidation rate of the particulate activated carbon sorbent composition is at least about 30% lower than a peak oxidation rate of the powdered activated carbon.

38. A method for sequestering contaminants from a flue gas stream comprising:
  receiving a flue gas stream comprising contaminants, the contaminants comprising at least mercury;
  injecting a particulate activated carbon sorbent composition into the flue gas stream to sequester at least a portion of the contaminants with the particulate activated carbon sorbent composition; and
  capturing at least a portion of the particulate activated carbon sorbent composition in a particulate collection device,
  wherein the particulate activated carbon sorbent composition comprises powdered activated carbon having a median particle size of not greater than about 30 μm, a particle density of at least about 0.4 g/cc, a total pore volume of at least about 0.2 cc/g, and a ratio of micropore volume to mesopore volume of at least about 0.7 and no more than about 1.5; and a passivation agent comprising a sulfur oxide compound comprising an anion defined by a formula $S_xO_7^{2-}$, where x=2 and y=3, 4, 5, 6, or 8.

39. The method recited in claim 38, wherein the particulate collection device selected from a baghouse, an electrostatic precipitator, and combinations thereof.

40. The method recited in claim 38, wherein the sulfur oxide compound comprises a cation that is selected from the group consisting of magnesium, calcium, barium, lithium, sodium, potassium, zinc, iron, copper, nickel, titanium, manganese, aluminum, and vanadium.

41. The method recited in claim 38, wherein a specific enthalpy of the particulate activated carbon sorbent composition is at least about 20% lower than a specific enthalpy of the powdered activated carbon, and wherein a peak oxidation rate of the particulate activated carbon sorbent composition is at least about 20% lower than a peak oxidation rate of the powdered activated carbon.

42. The method recited in claim 38, wherein the particulate activated carbon sorbent composition comprises between about 0.1 wt. % and about 20 wt. % of the sulfur oxide compound.

43. The method recited in claim 38, wherein the powdered activated carbon has a median particle size of not greater than about 20 μm and wherein the particle density is not greater than about 0.9 g/cc.

44. The method recited in claim 38, wherein the particulate activated carbon sorbent composition comprises not greater than about 10 wt. % of the sulfur oxide compound.

45. The method recited in claim 38, wherein the particulate activated carbon sorbent composition comprises not greater than about 5 wt. % of the sulfur oxide compound.

46. The method recited in claim 38, wherein a specific enthalpy of the particulate activated carbon sorbent composition is at least about 10% lower than a specific enthalpy of the powdered activated carbon, and wherein a peak oxidation rate of the particulate activated carbon sorbent composition is at least about 10% lower than a peak oxidation rate of the powdered activated carbon.

47. The method recited in claim 38, wherein the sulfur oxide compound is sodium thiosulfate.

48. The method recited in claim 38, wherein the sulfur oxide compound is ammonium persulfate.

49. The method recited in claim 38, wherein the sulfur oxide compound comprises a cation that is selected from the group consisting of hydrogen, a nitrogen-containing compound, and a cation.

50. The method recited in claim 49, wherein the cation is hydrogen.

51. The method recited in claim 49, wherein the cation is a nitrogen-containing compound.

52. The method recited in claim 49, wherein the cation is an alkaline earth metal.

53. The method recited in claim 49, wherein the cation is an alkali metal.

54. The method recited in claim 49, wherein the cation is a transition metal.

* * * * *